June 3, 1969 G. J. FAIRBANKS ET AL Re. 26,599

AUTOMOTIVE BOOSTER HEATER

Original Filed Feb. 10, 1964 Sheet 1 of 2

INVENTORS

Gordon J. Fairbanks.
Kurt Staiger.

By Charles T. Lind

Attorney

AUTOMOTIVE BOOSTER HEATER
Original Filed Feb. 10, 1964
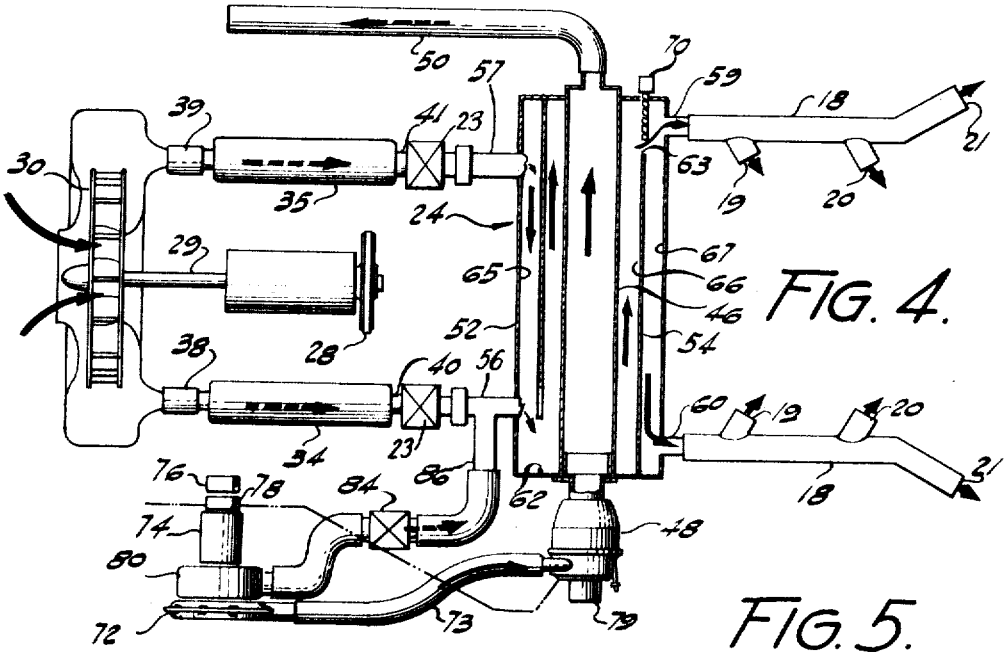
FIG. 4.
FIG. 5.
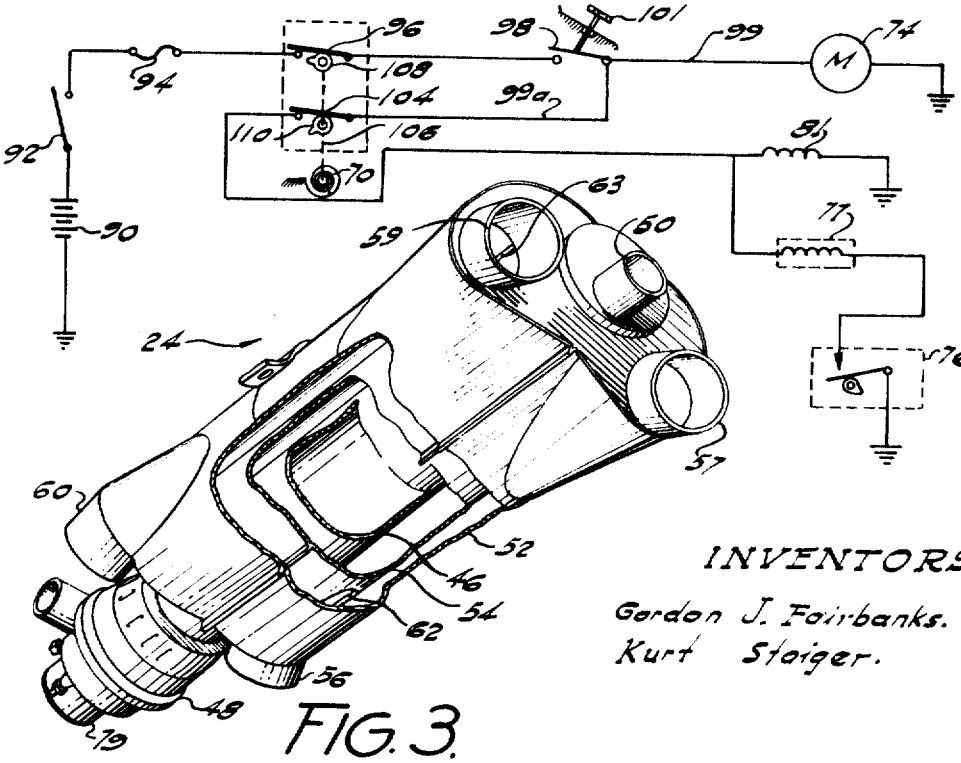
FIG. 3.
INVENTORS
Gordon J. Fairbanks.
Kurt Steiger.
By Charles T. Lind
Attorney United States Patent Office Re. 26,599
Reissued June 3, 1969

26,599

AUTOMOTIVE BOOSTER HEATER

Gordon J. Fairbanks and Kurt Staiger, Indianapolis, Ind., assignors to Stewart-Warner Corporation, Chicago, Ill., a corporation of Virginia Original No. 3,273,799, dated Sept. 20, 1966, Ser. No. 343,606, Feb. 10, 1964. Application for reissue Nov. 13, 1967, Ser. No. 686,001

Int. Cl. G05d *23/00;* B60h *1/02*

U.S. Cl. 237—2 28 Claims

Matter enclosed in heavy brackets [ ] appears in the original patent but forms no part of this reissue specification; matter printed in italics indicates the additions made by reissue.

This invention relates to a booster heater, and more particularly, to a booster heater for use in series flow with the conventional heater system of an air cooled engine type automotive vehicle, such as the Volkswagen automobile.

A major problem with air cooled engine type vehicles is the inadequate heating system of the vehicle. These heater systems generally use the vehicle engine for heating air, and the engine blower for forcing the heated air into the vehicle cab. However, since the engines of these vehicles are quite small, of low horsepower output, and often very efficient the total engine heat available as input for the heating system likewise is small and commonly inadequate especially in extremely cold weather. Also, since both the available engine heat and the blower pressure increase or decrease as the speed of the engine increases or decreases, the output from the heater system changes continuously with changes of engine output and speed. In some vehicles the ram effect caused by the movement of the vehicle for forcing heated air into the cab similarly changes, increasing or decreasing, as the vehicle speed changes. All of these factors combine to the disadvantage that at a specific output setting of the heater system, the heat output of the heater system changes as the vehicle is normally driven; sometimes being inadequate at all engine outputs and sometimes being inadequate at low engine outputs while being excessive at higher engine outputs.

Accordingly, an object of this invention is to provide a booster heater that operates automatically, when and only when the standard vehicle heater system proves inadequate, to stabilize the heat output of the combined heater system.

Another object of this invention is to provide a booster heater for direct installation on the Volkswagen vehicle for use with the Volkswagen heater system.

A more detailed object of this invention is to provide an improved heater that collects separate heat outputs from the dual heater outputs of the vehicle heater system, combines them in a single booster heat exchanger, and subsequently discharges the heated air to the dual inlets to the air distribution system of the vehicle.

Another object of this invention is to provide a booster heater that is located outside of the engine compartment, trunk space or vehicle cab in an out of the way place beneath the vehicle, and as such, that is particularly adaptable as original equipment installed at the vehicle factory or as auxiliary equipment installed by the individual vehicle owner.

In order that these and other objects can be more fully appreciated, reference is herein made to the accompanying drawings, wherein:

FIG. 3 is a perspective view, partly broken away and in section, of the preferred structural embodiment of the subject heater itself;

FIG. 4 is a schematic view showing the flow conditions of the subject heater as connected into the Volkswagen vehicle heater system; and FIG. 5 is a schematic view showing the electric control for the subject heater as connected into the vehicle heater system.

Figure 1:
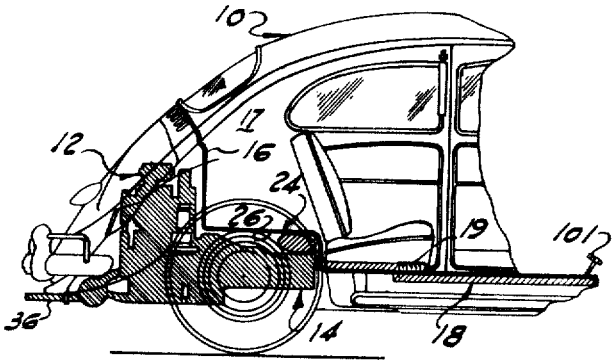
FIG. 1 is the rear end portion of a typical air cooled engine sedan showing the vehicle frame, the engine and transmission, and the location therebetween of the subject heater.

Although the heater to be disclosed herein can be used with other vehicles or in other applications, it will be disclosed as a booster heater in the Volkswagen heater system. FIG. 1 shows the rear end portion of a sedan 10 emphasizing in silhouette the engine 12 and transmission 14, and the interior frame partition 16 of the vehicle defining the interior cab 17. The standard heater system ordinarily furnished with the vehicle uses the heat of the engine 12 for heating air which is then passed through piping 18 (FIGS. 1 and 4) located in the vehicle frame for distribution to the cab 17. The air distribution is through two pipes each having three outlets 19, 20 and 21; outlet 19 being located below the rear seat in the back seat compartment, outlet 20 being located at the floor in the front seat compartment, and outlet 21 being located at the windshield for defrosting it. The subject heater 24 is located in a space 26 remaining between the engine 12 and transmission 14, and the frame 16 of the vehicle. The subject heater 24 is merely connected in series between the normal outlets of the vehicle heater system and the inlets to the distribution system 18.

Figure 2:
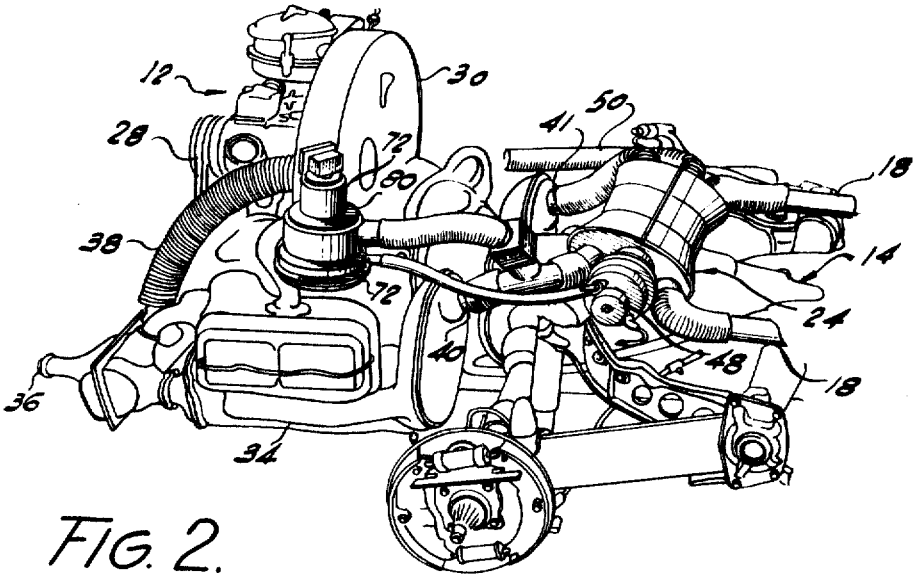
FIG. 2 is a perspective view of the engine and associated drive components of the vehicle of FIG. 1, and showing further therewith the location of the subject heater.

The schematic view of FIG. 4 shows the subject heater 24 used as a booster for the Volkswagen vehicle heater system. The engine 12 drives through appropriate V-belt and pulley 28, and shaft 29 a blower 30 (FIGS. 2 and 4) which is used to force cooling air over the engine and to provide air for the vehicle heating system. The heater system presently consists of an exhaust gas heat interchange with air for providing the heated air for the cab. This is shown in FIG. 2 where the exhaust from the forward two cylinders is directed through heat exchangers 34 and 35 (FIG. 4) to be discharged to atmosphere through the exhaust pipe 36. Flexible conduits 38 and 39 (FIG. 4) from the blower 30 direct air in a counterflow direction through the heat exchangers 34 and 35 (FIG. 4) to outlet connections 40 and 41. Appropriate conduits (not shown) normally would connect the heat exchanger outlets 40 and 41 directly to the piping 18 for distributing the heated air to the vehicle cab 17. Heat blown to the cab 17 is regulated by a hand control 101 (FIG. 1) which controls adjustable valves 23 (FIG. 4) at the heat exchanger outputs 40, 41 to vary the amount of heated air flowing to the cabin.

The subject heater 24 (best shown in FIGS. 2, 3 and 4) includes a burner tube 46 having a burner assembly 48 secured thereto at one end and having an outlet 50 for exhaust at the other end. Two other tubes 52 and 54 are positioned over the burner tube 46 and operate to convey the air to be heated in heat exchange relationship with the burner tube 46. The opposite ends of outer tube 52 have inlets 56 and 57 for receiving the air from the vehicle heat exchanger outlets 40 and 41 and have outlets 59 and 60 for communicating with the vehicle distribution system 18. The intermediate tube 54 extends around the burner tube 46 and operates to collect the dual air inlets 56 and 57 to the heater into a combined flow over the burner tube 46, and to split this combined single flow afterwards into the dual outlets 59 and 60 to the vehicle distribution system 18. To this end the intermediate tube 54 extends completely around the burner tube 46 and is continuous except for two openings 62 and 63 disposed at its opposite ends. It also has longitudinally extending ribs 64 which are sealed to the inner surface of tube 52. In other words, the outer tube 52 extends over the intermediate tube 54 and defines with ribs 64 two spaces 65 and 67 separated from one another except by the communication through the spaced openings 62 and 63 across a third space 66 annular in shape defined between the burner tube 46 and the intermediate tube 54. A thermostat bimetal 70 extending into the defined space 66 generally at the opening 63 is effective to sense the outlet temperature of the air passing from the heater 24. In operation, the separate air streams from the vehicle heat exchanger outlets 40 and 41 pass through the separate inlet openings 56 and 57 of the heater where they are combined and pass together through opening 62 and space 66 over the single heated burner tube 46, and are thereafter divided into two streams passing from either the outlet 59 or 60 to the distribution system 18 to the vehicle cab.

A separate blower 72 driven by electric motor 74 (FIGS. 4 and 5) is used to supply the burner 48 through hose 73 with its required combustion air. Appropriate ignition means for the burner 48 include breaker points 76 also driven by the motor 74 and the high voltage coil 77. A fuel pump 78 having its outlet to the burner 48 controlled by a valve 79 opened by solenoid 81 is also driven by the motor 74. A separate blower 80 is also driven by the motor 74 to supply additional air for the heater air flow system when the vehicle air output is low. The outlet from the blower 80 passes through a one-way check valve 84 to a T 86 in the air conduit upstream of inlet opening 56. Since the pressure drop in the air system downstream of the T 86 is low, a blower 80 of minimum output power can be provided while yet having ample volumetric air flow. For example, the blower 80 having an output of approximately 40 cubic feet per minute can be driven by the motor 74 which is normally used to drive only the blower 72 for the combustion air, fuel pump 78 and the breaker points 76. The check valve 84 prevents back flow through the blower 80 if and when the outlet pressure of the engine blower 30 at the check valve exceeds that of the auxiliary blower 80.

FIG. 5 shows the electric control particularly adaptable for the subject booster heater 24 used in combination with the vehicle heater system. A power source such as a battery 90 is connected in series through ignition switch 92, fuse 94, an adjustable thermostatic actuated switch 96 and interlock switch 98 to either of two parallel circuits through lines 99 and **99*a* for the control of the system. The interlock switch 98 is mechanically connected to the heater control 101 (FIGS. 1 and 5) on the vehicle heater system, so that when the vehicle control 101 is opened to give heater output above a certain percentage of maximum output, the interlock switch will close to energize the subject heater dependent in turn on the operation of thermostat switch 96. Preferably, the interlock switch 98 should be closed when the vehicle heater control 101 is set for 50% or higher of maximum heater capacity. From interlock switch 98 line 99 completes a circuit through motor 74 to ground. A second circuit is formed through line 99*a* that includes a second thermostat switch 104 to the fuel control means including solenoid 81, and to the ignition control means including high voltage coil 77 and breaker points 76. The thermostat switches 96 and 104 preferably are operated by the same bimetal 70 except that the temperatures at which the switches open should differ by approximately 10 or 15° F. The adjustable thermostatic control disclosed in U.S. Patent 2,803,723 is particularly adaptable, where a helical bimetal (FIG. 5) rotates a common shaft 106 to which separate cam members 108 and 110 are connected in slightly out of phase relationship to act, respectively, upon separate switches 96 and 104 as the shaft 106 rotates. The cams 108 and 110 are manually rotatable with respect to their switch contacts 96, 104 to provide a controllable adjustment of the heat output. It is to be noted that the bimetal 70 shown in FIG. 5 is arranged to rotate the cams 108 and 110** counterclockwise with increasing temperature to a limit position at which both contacts are open. The cams are shown in their clockwise rotation limit position.

It is understood that both switches 96 and 104 are closed at normal outdoor temperatures, and are opened when there is no heat demand. The booster heater is designed to cut off at a thermostat-sensed temperature consistent with a desired heat output, such cut off temperature being commonly between 150° and 265° F. depending on the setting of the thermostat. It has been determined that for the particular case being discussed this range of temperatures at the heater output will provide a satisfactory range of temperatures within a wide range of ambient and driving conditions. For a rising temperature approaching cut-off the thermostat switch 104 controlling the fuel shutoff control solenoid 81 and the ignition control of coil 77 and points 76 for the burner 48 opens first, thus cutting off the burner assembly 48. The motor 74 however continues to operate the blower 80 to supply air for circulating over the burner tube 46 and into the vehicle distribution system to draw off any heat remaining therein. If the outlet temperature from the heater system as sensed by bimetal 70 continues to increase due to the engine heat the thermostat switch 96 in then opened to terminate operation of the motor 74 and thus completely shut off the booster heater 24. If the heat output thereafter is still too high, the control 101 on the vehicle heater system for varying air flow must be adjusted to a lower output setting. On the other hand if the temperature of the outlet air from the heater system again becomes sufficiently low to close switch 104, the burner is again energized. Thus, if the vehicle heater control 101 is opened to the required percentage the interlock switch 98 will be closed to energize the booster heater system 24 dependent only on the position of the thermostat switches 96 and 104.

The heat output from the heater 24 will be constant at most operating conditions, since both the amount of fuel burned in the burner assembly 48 and the operating speed of the blower 80 can be held constant. Thus, when the heat output of the vehicle heater system is low it can be boosted by the output of the subject heater. The bimetal 70 senses the outlet temperature from the combined heater system, and operates thereby to cycle the heater 24 on and off as required. It should be noted that if the blower 30 of the engine operates at sufficient speed to cause its outlet pressure to exceed the outlet pressure of the burner blower 80, the check valve 84 will then close to prevent back flow through the blower 80, although the blower 80 continues to operate. To achieve this, it is desired that blower 80 be of the constant pressure output as compared to a constant volume output. As thus disclosed, the system is entirely automatic to supplement the inadequate heat output of the vehicle heater system as required.

While only a single embodiment of the subject invention has been disclosed, it will be obvious that modifications may be made therein without departing from the inventive concept. Accordingly, it is desired that this invention be limited only by the scope of the claims hereinafter following.

What is claimed is:

1. A booster heater for use with a conventional vehicle cab heater system having means for heating air including the vehicle engine, means for distributing the heated air to the vehicle cab, and means for forcing the heated air through the heating and distributing means to the vehicle cab; said booster heater comprising a burner; a heat exchanger for the burner having an inlet for connection to said heating means and an outlet for connection to the distributing means of said vehicle; means providing unheated air to said burner heat exchanger; valve means between the unheated air providing means and said burner heat exchanger operable to permit the unheated air to pass to said burner heat exchanger only when the pressure output of the vehicle air forcing means at said valve means is less than the pressure output of said unheated air providing means at said valve means; and temperature responsive means for controlling the operation of said burner to control the temperature of the air passing to the vehicle cab.

2. A booster heater for use with a conventional vehicle cab heater system having means for heating air including a vehicle heat exchanger, means for distributing the heated air to the vehicle cab, and a fan for forcing the heated air through the heating and distributing means to the vehicle cab; said booster heater comprising a burner; a heat exchanger for the burner having an inlet for connection to said heating means and an outlet for connection to the distributing means of said vehicle, a blower connected to the input of said burner heat exchanger for forcing unheated air thereto; valve means between said blower and said heat exchanger operable to permit unheated air to pass to said heat exchanger only when the pressure output of said fan is less than the pressure output of said blower and thermostatic means for controlling the operation of the blower and burner to control the temperature of the air passing to said vehicle cab.

3. A booster heater for use with a conventional vehicle cab heater system having means for heating air including a vehicle heat exchanger, means for distributing the heated air to the vehicle cab, and a fan for forcing the heated air through the heating and distributing means to the vehicle cab; said booster heater comprising a burner; a heat exchanger for the burner having an inlet for connection to said heating means and an outlet for connection to the distributing means of said vehicle; a blower connected to the input of said burner heat exchanger for forcing unheated air thereto; a check valve between the blower and said burner heat exchanger operable to permit the unheated air to pass to said burner heat exchanger only when the pressure output of the vehicle fan at the check valve is less than the pressure output of the blower at the check valve; and thermostatic means for controlling the operation of the blower and burner to control the temperature of the air passing to said vehicle cab.

4. In a vehicle cab heater system having means for heating air including a vehicle heat exchanger, means for distributing the heated air to the vehicle cab, a fan for forcing the heated air through the heating and distributing means to the vehicle cab, and means for adjusting the volumetric air output of the vehicle heater system; a booster heater comprising a burner; a heat exchanger for the burner having an input connected to said heating means and an output connected to said distributing means, a blower connected to the input of said burner heat exchanger for forcing unheated air thereto; means for enabling the operation of said blower and burner including a control device mechanically connected to the vehicle heater output adjusting means operable to render the burner and blower inactive at all adjusting output settings of the vehicle heater adjusting means less than a given percentage of maximum air flow and to render said burner and blower active at all higher output settings of the vehicle heater adjusting means; and means for controlling the operation of the blower and burner comprising a first switch for activating said blower, a second switch for activating said burner and a bimetal thermostatic element at the outlet of said burner heat exchanger for actuating said switches to control the temperature of the air thereat.

5. In a vehicle cab heater system having means for heating air including a vehicle heat exchanger, means for distributing the heated air to the vehicle cab, a fan for forcing the heated air through the heating and distributing means to the vehicle cab, and means for adjusting the volumetric air output of the vehicle heater system; a booster heater comprising a burner; a heat exchanger for the burner having an input connected to said heating means and an output connected to said distributing means; a blower connected to the input of said burner heat exchanger for forcing unheated air thereto; a check valve between the blower and said burner heat exchanger operable to permit the unheated air to pass to said burner heat exchanger only when the pressure output of the vehicle fan at the check valve is less than the pressure output of the blower at the check valve; means for enabling the operation of said blower and burner including a control device mechanically connected to the vehicle heater output adjusting means operable to render the burner and blower inactive at all adjusting output settings of the vehicle heater adjusting means less than a given percentage of maximum air flow and to render burner and blower active at all higher output settings of the vehicle heater adjusting means; and means for controlling the operation of the blower and burner comprising a first switch for activating said blower, a second switch for activating said burner and a bimetal thermostatic element at the outlet of said burner heat exchanger for actuating said switches to control the temperature of the air thereat.

6. In a vehicle cab heater system having means for heating air including a vehicle heat exchanger, means for distributing the heated air to the vehicle cab, and a fan for forcing the heated air through the heating and distributing means to the vehicle cab; said booster heater comprising a burner; a heat exchanger for the burner having an input connected to said heating means and an output connected to said distributing means; a blower connected to the input of said burner heat exchanger for forcing unheated air thereto; and means for controlling the operation of said blower and burner comprising a first switch for activating said blower, a second switch for activating said burner, a bimetal thermostatic element at the outlet of said burner heat exchanger and means including separate cams operable by said bimetal element for actuating said switches at respectively different temperatures to control the temperature of the air passing to said vehicle cab.

7. In a vehicle cab heater system having means for heating air including a vehicle heat exchanger, means for distributing the heated air to the vehicle cab, and a fan for forcing the heated air through the heating and distributing means to the vehicle cab; a booster heater comprising a burner; a heat exchanger for the burner having an input connected to said heating means and an output connected to said distributing means; a blower connected to the input of said burner heat exchanger for forcing unheated air thereto; a check valve between the blower and said burner heat exchanger operable to permit the unheated air to pass to said burner heat exchanger only when the pressure output of the fan at the check valve is less than the pressure output of the blower at the check valve; and means for controlling the operation of said blower and burner comprising a first switch for activating said blower, a second switch for activating said burner, a bimetal thermostatic element at the outlet of said burner heat exchanger and means including separate cams operable by said bimetal element for actuating said switches at respectively different temperatures to control the temperature of the air passing to said vehicle cab.

8. In a vehicle cab heater system having means for heating air including a vehicle heat exchanger, means for distributing the heated air to the vehicle cab, a fan for forcing the heated air through the heating and distributing means to the vehicle cab, and means for adjusting the volumetric air output of the vehicle heater system; a booster heater comprising a burner; a heat exchanger for the burner having an input connected to said heating means and an output connected to said distributing means; a blower connected to the input of said burner heat exchanger for forcing unheated air thereto; a check valve between the blower and said burner heat exchanger operable to permit the unheated air to pass to said burner heat exchanger only when the pressure output of said fan at the check valve is less than the pressure output of the blower at the check valve; means for enabling the operation of said blower and burner including a control device mechanically connected to the vehicle heater output adjusting means operable to render the burner and blower inactive at all adjusting output settings of the vehicle heater adjusting means less than a given percentage of maximum air flow and to render said burner and blower active at all higher output settings of the vehicle heater adjusting means; and means for controlling the operation of said blower and burner comprising a first switch for activating said blower, a second switch for activating said burner, a bimetal thermostatic element at the outlet of said burner heat exchanger and means including separate cams operable by said bimetal element for actuating said switches at respectively different temperatures to control the temperature of the air passing to said vehicle cab.

9. A system for heating an engine-driven vehicle passenger cab comprising means for heating air including a vehicle heat exchanger; means for distributing heated air to the vehicle cab; a burner; a heat exchanger for the burner having an input connected to said heating means and an output connected to said distributing means; means for forcing the heated air through the heating means, burner heat exchanger, and distributing means to the vehicle cab; means in communication with the input of said burner heat exchanger for providing unheated air thereto; valve means between the unheated air providing means and said burner heat exchanger operable to permit the additional air to pass through said burner heat exchanger only when the pressure output of said air forcing means at said valve means is less than the pressure output of said unheated air providing means at said valve means; and means for controlling the operation of said burner to control the temperature of the air passing to said vehicle cab.

10. A system for heating an engine-driven vehicle passenger cab comprising means for heating air including a vehicle heat exchanger; means for distributing heated air to the vehicle cab; a burner; a heat exchanger for the burner having an input connected to said heating means and an output connected to said distributing means; a fan for forcing the heated air through the heating means, burner heat exchanger and distributing means to the vehicle cab; a blower connected to the input of said burner heat exchanger for forcing unheated air [therethrough] *thereto*; and means for controlling the operation of said blower and burner to control the temperature of the air passing to said vehicle cab.

11. The system of claim 10 comprising in addition a check valve between the blower and said burner heat exchanger operable to permit the unheated air to pass through said burner heat exchanger only when the pressure output of said fan at the check valve is less than the pressure output of the blower at the check valve.

12. The system of claim 10 comprising in addition means for enabling the operation of said blower and the burner including a control device mechanically connected to the vehicle heater output adjusting means operable to render the burner and blower inactive at all adjusting output settings of the vehicle heater adjusting means less then a given percentage of maximum flow and to render said burner and blower means active at all higher output settings of the vehicle heater adjusting means.

13. A system for heating an engine-driven vehicle passenger cab comprising means for heating air including an engine exhaust heat exchanger; means for distributing heated air to the vehicle cab; a burner; a heat exchanger for the burner having an input connected to said heating means and an output connected to said distributing means; a fan for forcing the heated air through the heating means, burner heat exchanger and said distributing means to the vehicle cab; a blower connected to the input of said burner heat exchanger for forcing unheated air [therethrough] *thereto*; and means for controlling the operation of said blower and burner comprising a first switch for activating said blower, a second switch for activating said burner, a bimetal thermostatic element at the outlet of said burner heat exchanger, and means including separate cams [operably] *operable* by said bimetal element for actuating said switches at respectively different temperatures to control the temperature of the air passing to said vehicle cab.

14. A system for heating an engine-driven vehicle passenger cab comprising means for heating air including and engine exhause heat exchanger; means for distributing heated air to the vehicle cab; a burner; a heat exchanger for the burner having an input connected to said heating means and an output connetced to said distributing means; a fan for forcing the heated air through the heating means, burner heat exchanger and said distributing means to the vehicle cab; a blower connected to the input of said burner heat exchanger for forcing unheated air [therethrough] *thereto*; a check valve between the blower and said burner heat exchanger operable to permit the unheated air to pass through said burner heat exchanger only when the pressure output of said fan at the check valve is less than the pressure output of the blower at the check valve; and means for controlling the operation of said blower and burner comprising a first switch for activating said blower, a second switch for activating said burner, a bimetal thermostatic element at the outlet of said burner heat exchanger, and means including separate cams operable by said bimetal elements for actuating said switches at respectively different temperatures to control the temperature of the air passing to said vehicle cab.

15. A system for heating an engine-driven vehicle passenger cab comprising means for heating air including an engine exhaust heat exchanger; means for distributing heated air to the vehicle cab; means for adjusting the volumetric air output of the vehicle heater system; a burner; a heat exchanger for the burner having an input connected to said heating means and an output connected to said distributing means; a fan for forcing the heated air through the heating means, burner heat exchanger and distributing means to the vehicle cab; a blower connected to the input of said burner heat exchanger for forcing unheated air [therethrough] *thereto*; a check valve between the blower and said burner heat exchanger operable to permit the unheated air to pass through said burner heat exchanger only when the pressure output of said fan at the check valve is less than the pressure output of the blower at the check valve; means for enabling the operation of said blower and burner including a control device mechanically connected to the vehicle heater output adjusting means operable to render the burner and blower inactive at all adjusting output settings of the vehicle heater adjusting means less than a given percentage of maximum flow and to render said burner and blower means active at all higher output settings of the vehicle heater adjusting means; and means for controlling the operation of said blower and burner comprising a first switch for activating said blower, a second switch for activating said burner, a bimetal thermostatic element at the outlet of said burner heat exchanger, and means including separate cams operable by said bimetal element for actuating said switches at respectively different temperatures to control the temperature of the air passing to said vehicle cab.

16. A booster heater for series air flow connection with a dual air flow vehicle heater and cabin air distribution system comprising ignition means; means for supplying air and fuel to be ignited by said ignition means; a tube connected at one end to said ignition and fuel supplying means, said tube defining a combustion chamber and an exhaust outlet for combustion gases; a second tube surrounding said first tube having a pair of openings disposed longitudinally opposite one another on either side of said first tube; a third tube surrounding said second tube and defining therewith a pair of longitudinally extending separate air chambers; means defining a pair of inlets to one of said air chambers connectable to said vehicle heater; means defining a pair of outlets from the other of said air chambers connectable to said cabin air distribution system, a blower for providing additional air to said one air chamber, and thermostatic means in said other air chamber for controlling the operation of said ignition means, said fuel and air supplying means, and said blower.

17. A booster heater for series air flow connection with an air flow vehicle heater and cabin air distribution system comprising ignition means; means for supplying air and fuel to be ignited by said ignition means; a tube connected at one end to said ignition and fuel supplying means, said tube defining a combustion chamber and an exhaust outlet for combustion gases; a second tube surrounding said first tube having a pair of openings disposed longitudinally opposite one another on either side of said first tube; a third tube surrounding said second tube and defining therewith a pair of longitudinally extending separate air chambers; means defining at least one inlet to one of said air chambers connectable to said vehicle heater, means defining at least one outlet from the other of said air chambers connectable to said cabin air distribution system, means for providing additional air to said one air chamber, and thermostatic means in said other air chamber for controlling the operation of said ignition means, said fuel and air supplying and said additional air providing means.

18. A booster heater for series air flow connection with an air flow vehicle heater and cabin air distribution system to add heat to the air flowing through said vehicle heater and to heat additional air provided thereto, comprising ignition means; means for supplying air and fuel to be ignited by said ignition means; a tube connected at one end to said ignition and fuel supplying means, said tube defining a combustion chamber and an exhaust outlet for combustion gases; a second tube surrounding said first tube having a pair of openings disposed longitudinally opposite one another on either side of said first tube; a third tube surrounding said second tube and defining therewith a pair of longitudinally extending separate air chambers; means defining at least one inlet to one of said air chambers connectable to said vehicle heater, means defining at least one outlet from the other of said air chambers connectable to said cabin air distribution system, and means defining an inlet for the additional air to said one air chamber.

19. A booster heater for series air flow connection with an air flow vehicle heater and cabin air distribution system to add heat to the air flowing through said vehicle heater and to heat additional air provided thereto, comprising ignition means; means for supplying air and fuel to be ignited by said ignition means; a tube connected at one end to said ignition and fuel supplying means, said tube defining a combustion chamber and an exhaust outlet for combustion gases; a second tube surrounding said first tube having a pair of openings disposed longitudinally opposite one another on either side of said first tube; a third tube surrounding said second tube and defining therewith a pair of longitudinally extending separate air chambers; means defining at least one inlet to one of said air chambers connectable to said vehicle heater, and means defining at least one outlet from the other of said air chambers connectable to said cabin air distribution system.

20. In a system for providing air to the cab of a vehicle having an engine, an engine driven air blower and an air passage between the blower and the vehicle cab, the improvement comprising means for maintaining at least a desired minimum volumetric air flow rate to said vehicle cab including an auxiliary air blower of said desired minimum flow rate having its output connected to said air passage and a check valve between the output of said auxiliary blower and the air passage operable to pass air thereto when the volumetric air flow rate of said engine blower is below the desired minimum.

21. In a system for providing air to the cab of a vehicle having an engine, an engine driven air blower and ain air passage between the blower and the vehicle cab, the improvement comprising means for maintaining at least a desired minimum volumetric air flow rate to said vehicle cab including an auxiliary air blower of said desired minimum flow rate having its output connected to said air passage and means to pass air from said auxiliary blower to said passage when the volumetric air flow rate of said engine blower is below the desired minimum.

*22. In the system of claim 20 the improvement further comprising a booster heater in said air passage between the output of said auxiliary air blower and said vehicle cab.*

*23. In the system of claim 21 the improvement further comprising a booster heater in said air passage between the output of said auxiliary air blower and said vehicle cab.*

*24. A system for heating an engine-driven vehicle passenger cab comprising means for heating air including a vehicle engine exhaust heat exchanger; means for distributing air to the vehicle cab; a burner; a heat exchanger for the burner having an input connected to said heating means and an output connected to said distributing means; means including a fan mechanically driven by said vehicle engine for forcing air through said heating means, burner heat exchanger and distributing means to the vehicle cab; and means including a blower for forcing additional air unheated by said burner heat exchanger to the input of said burner heat exchanger when the flow rate of air from said engine driven fan falls below a predetermined minimum.*

*25. The system of claim 24 wherein said last mentioned means comprises a check valve between said blower and said burner heat exchanger operable to permit additional air to pass to said burner heat exchanger only when the pressure output of said fan at the check valve is less than the pressure output of the blower at the check valve.*

*26. A system for heating a engine-driven vehicle passenger cab having means including a fan mechanically driven by said engine, means for conducting air from said fan to said passenger cab, a vehicle engine exhaust heat exchanger for heating air passing through said air conducting means, a booster heater for heating the air in said air conducting means downstream from said engine exhaust heat exchanger, and means including a blower for providing additional air unheated by said booster heater to said air conducting means upstream from said booster heater when the flow rate of air from said engine driven fan falls below a predetermined minimum.*

*27. The system of claim 26 wherein said last mentioned means comprises a check valve between said blower and said air conducting means operable to prevent additional air from flowing to said air conducting means when the pressure output from said engine driven fan is greater than the pressure output of said blower.*

*28. In a heating system for a vehicle in which air delivered by the vehicle engine fan is heated by an engine exhaust gas heat exchanger and distributed to the vehicle cab and additionally heated by a booster heater serially connected to the exhaust gas heat exchanger for adding heat to the air after the air is heated by the exhaust gas heat exchanger and before the air is distributed to the vehicle cab when the heat supplied by the exhaust gas heat exchanger is inadequate to meet the desired demand, the improvement therein comprising means for providing additional air unheated by said booster heater to the booster heater including a blower and a check valve operable responsive to the pressure differential between the outputs of said fan and said blower to prevent air from said blower to pass to said booster heater when*

*the pressure output of said fan is greater than said predetermined minimum.*

References Cited

The following references cited by the Examiner, are of record in the patented file of this patent or the original patent.

UNITED STATES PATENTS

| | | | |
|---|---|---|---|
| 2,009,823 | 7/1930 | Van Vulpen | 237—5 |
| 2,463,908 | 3/1949 | Rose | 237—8 |
| 3,008,642 | 11/1961 | Kofnick | 237—12.3 |

EDWARD J. MICHAEL, *Primary Examiner.*

U.S. Cl. X.R.

237—12.3